May 24, 1966      J. D. SMITH      3,252,493
THREE PART FASTENER WITH SPACER MEANS
Filed May 22, 1964
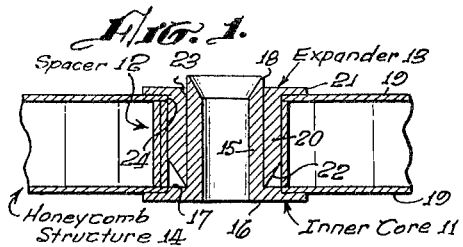
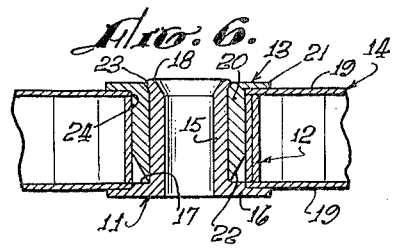
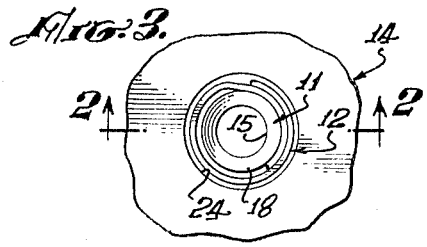
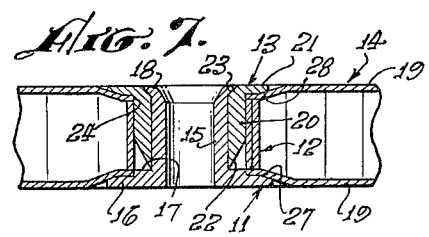
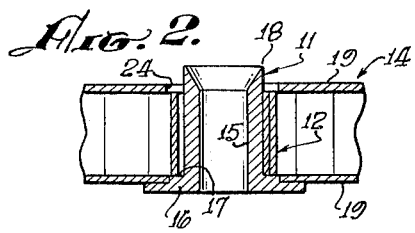
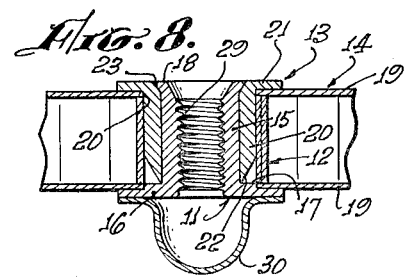
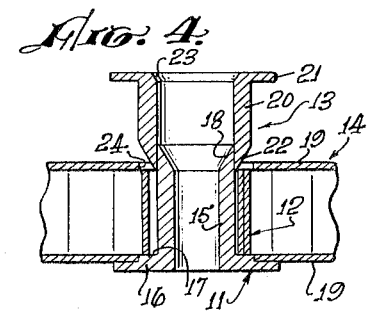
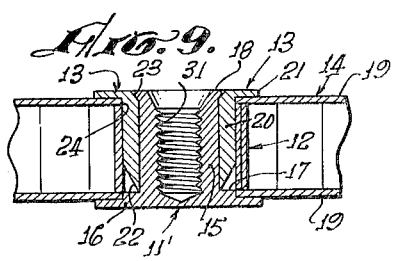
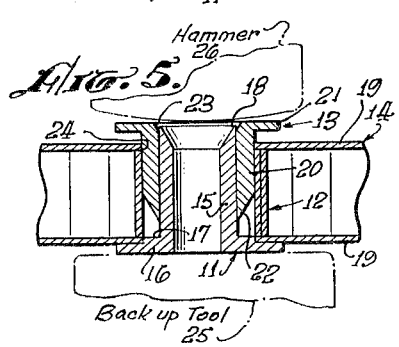
JOSEPH D. SMITH,
INVENTOR.
BY
ATTORNEY.

United States Patent Office 3,252,493
Patented May 24, 1966

3,252,493
THREE PART FASTENER WITH SPACER MEANS
Joseph D. Smith, Pomona, Calif., assignor to General Dynamics Corporation, Pomona, Calif., a corporation of Delaware
Filed May 22, 1964, Ser. No. 369,464
8 Claims. (Cl. 151—41.7)

This invention relates to fasteners, particularly to fasteners which are capable of individually gripping two spaced sheets, and more particularly to fasteners for use with sandwich-type structural materials and which are capable of individually gripping each of the two face sheets of the structural material.

There is a growing commercial requirement for a satisfactory fastener usable with spaced parts. For example, metal sheets may be provided which must be rigidly fastened together yet spaced apart a predetermined amount. In many cases the structure will include a honeycomb or other low density core between the spaced sheet members.

Another growing requirement is to provide fasteners or grommets which may be inserted in a panel or sheet to provide a reinforced aperture for reception of a screw or bolt or other securing device for attaching the panel to a structural member such as a joist or beam, or to attach instruments, equipment, or other structure to the panel. This invention deals particularly with the problem of attaching light weight, laminated insulating panels to the structural longerons or stringers of an aircraft fuselage, railway cars, trucks, buildings, etc., and especially to ways and means of providing fasteners for wall panel, lining, or flooring which embodies a pair of spaced sheets of foil or other material attached to opposite sides of a cellular core lamination of metal foil, treated paper or thin fiber sheet, corrugated or otherwise wrinkled to provide a multitude of air cells between the sheets. Such a panel is relatively fragile because of this cellular structure and the thinness of the sheets of material composing it, and prior art attempts to secure the same to structure members through un-reinforced holes bored in the panel have not met with full success.

In our modern aircraft and missiles, the strength of material as compared to its weight is very important. This requirement has led to the increased use of structure material having two faced sheets with low density material, such as honeycomb, core separating these two faces. This structure has the beneficial high strength-to-weight and rigidity-to-weight ratio desired, but has the disadvantage that both of the face sheets must be individually gripped in order to apply the maximum load to the structural material at any one point without crushing the material.

The conventional rivet which does not have any spacing means on it would not meet the above stated requirements in that it would cause the face sheets to crush when load is applied. Further, it has been found to be expensive and unreliable to attempt to provide a rivet spacer between these space sheets and then rivet the sheets together in a conventional manner. Prior art attempts to solve the above problems are exemplified by the following patents: U.S. Patents 2,700,172 to F. W. Roke; 2,767,877 to R. L. Newsom; 2,961,760 to R. E. Horton et al.; and 3,078,022 to M. E. Rodgers.

This invention overcomes the above mentioned problems in that it provides a simply constructed fastener for use in sandwich type panel structure that can be installed with a minimum of panel preparation and with the simplest of hand tools.

Therefore, it is an object of this invention to provide a fastener for engaging material at spaced points.

A further object of the invention is to provide a fastener which will individually grip two spaced sheets.

Another object of the invention is to provide a fastener for use in sandwich type panel structure that can be installed with a minimum of panel preparation and with the simplest of tools.

Another object of the invention is to provide a fastener for use in sandwich type panel structure which utilizes spacer means which expands out between the outer skins to provide a surface on which the fastener can grip the skins.

Other objects of the invention not specifically set forth above will become readily apparent from the following description and drawings in which:

FIG. 1 is a cross-sectional view of the elements of one embodiment of the invention;

FIGS. 2–6 are cross-sectional views illustrating the steps involved in the installation of the FIG. 1 embodiment;

FIG. 7 is a cross-sectional view of a modification of the FIG. 1 embodiment having a flush installation with the sandwich type skin; and FIGS. 8 and 9 are cross-sectional views of modifications of the FIG. 1 embodiment having a threaded core and for use in no-leak applications.

Broadly the invention relates to a fastener construction for use in sandwich type panel structures comprising a spacer element in the form of an expandable coil, a core member in the form of a hollow tubular body having a flange at one end and having the other end tapered to a thin edge, and an expander element in the general shape of the core except for a countersink in the flange portion. To assemble the fastener, the expander is forcibly driven as with a hammer between the core and spacer, which results in the spacer being expanded outwardly. As the expander is being driven, the core end having the tapered edge starts to protrude at the flanged end of the expander. Continued striking with the hammer results in said tapered edge being peened into the countersink of the expander. A feature of the invention is the fact that the spacer provides a supporting structure acting with the flanges for firmly gripping the panels or skins of the structure. The fastener may be modified by providing screw threads in the core hole for use with bolts, fittings or the like, and/or else the hole may be suitably closed at the flange end of the core for no-leak applications.

As shown in FIG. 1, the fastener consists generally of three elements; namely, an inner core 11, an expandable spacer 12, and an expander 13, positioned in an aperture in sandwich type panel material such as honeycomb structure 14.

The inner core 11 consists essentially of a tubular body portion 15 and a wide flanged portion 16 having a step or shoulder 17, said tubular body 15 being countersunk at the end opposite flange 16 which is tapered to define a thin outer edge 18.

The expandable spacer 12 consists of a coil of material having approximately 1 and ⅓ turns (see FIG. 3) so that it can expand to a larger diameter and at least form a complete circle in the expanded position. The length of spacer 12 depends on the distance between the panel sheets or skins 19 of honeycomb structure 14 so as to provide a support between sheets or skins 19 when the fastener is installed.

The expander 13 consists essentially of a tubular body portion 20 and a flanged portion 21. Tubular body portion 20 has an internal diameter which cooperates with the external diameter of tubular body portion 15 so as to provide a close fit therebetween. The end of tubular body 20 opposite flange 21 is tapered at 22 to a thin edge so as to provide an inclined surface which serves to expand spacer 12 when expander 13 is forced between core 11 and spacer 12. The center hole of expander 13 at the end opposite taper 22 on body 20 is slightly countersunk at 23 (see FIG. 4).

To install the fastener in honeycomb structure 14, a hole or aperture 24 (see FIG. 2) is made through the structure. Aperture 24 is slightly larger than the spacer 12 but of substantially the same cross section as the step or shoulder 17 of inner core flange 16. Spacer 12 is placed on inner core 11 so that it rests on the small shoulder 17 of flange 16 and the assembled elements 11 and 12 are inserted into aperture 24 so that shoulder 17 is located within the hole through lower panel or skin 19 with tubular body 15 of inner core 11 extending through the hole in upper panel 19, as shown in FIG. 2. The expander 13 is positioned around inner core 11 with the edge of taper 22 located between the tubular body 15 of inner core 11 and spacer 12 as shown in FIG. 4. Expander 13 is then pressed down as far it will go.

As shown in FIG. 5, a back up tool 25 of any type of sufficient size to extend over flange 16 of inner core 11 is pressed against the flange 16 and a tool such as hammer 26 is used to drive expander 13 between inner core 11 and spacer 12 which expands spacer 12 so that it moves outwardly between panels 19 and provides a support for the skins or panels of structure 14 thus providing a good surface for the flanges 16 and 21 to grip. Just before the expander 13 is driven down to the point where the flange 21 thereof will start exerting pressure on upper panel 19, the countersunk edge 18 of the tubular body 15 of core 11 will start to protrude out into countersink 23 of the flange 21 of expander 13 due to the striking of the expander 13 and edge 18 of inner core 11 with hammer 26. Continued striking of edge 18 with hammer 26 will peen the end of the inner core body 15 into the counter sink 23 of expander flange 21 as expander 13 is driven down. The peening is continued until the flanges 16 and 21 firmly grip panels 19 so that the fastener cannot be rotated in aperture 24, as shown in FIG. 6.

The elements of the FIG. 7 embodiment are similar to those of FIG. 1 except that they are designed to provide a flush surface with honeycomb structure 14 when installed. Inner core 11 is constructed in the same manner as described above except that tubular body 15 is shorter in length and that flange 16 includes a tapered surface 27. Spacer 12 is of the same type construction except that it does not extend the full distance between the structure panels 19 as in the FIG. 1 embodiment, thereby allowing panels 19 to be pulled inwardly around aperture 24 when the fastener is installed. Expander 13 is constructed in the same manner as described above except that the tubular body 20 is shorter in length and that flange 21 includes a tapered surface 28.

The fastener of the FIG. 7 embodiment is installed in the same manner as described above with respect to FIGS. 1–6 except that expander 13 is driven down by a means such as a hammer or the like until the outer surfaces of flanges 16 and 21 are flush with panels 19 due to the shortened length of bodies 15 and 20 of the core 11 and expander 13, respectively, and the shorter width of spacer 12. As in the FIGS. 1–6 embodiment, spacer 12 serves as a support for flanges 16 and 21. The tapered surfaces 27 and 28 of flanges 16 and 21 provide a relatively smooth inward curvature of the panels 19 around aperture 24 as shown in FIG. 7.

The elements of the FIG. 8 embodiment are similar to those of FIG. 1 except that inner core 11 is threaded at 29 for use with a cap screw, stud bolt, pipe or tube fittings, conduit, etc., and is installed in the same manner as described above with respect to FIGS. 2–6. For no leak applications, a dome 30 can be attached to the flange 16 of inner core 11 by any conventional means. The dome 30 may be attached after installation of the fastener or before installation if the back up tool is configured to accommodate the dome.

The embodiment shown in FIG. 9 is similar to the FIG. 1 device except that inner core 11' is bottom tapped for no leak applications and threaded at 31 for use with attaching means such as described above with respect to FIG. 8. Installation of the FIG. 9 embodiment is accomplished in the same manner as described above in FIGS. 2–6.

The advantages of this invention over known fasteners are that (1) the same size hole is utilized in both skins of the structure for installation of the fastener so only one size of drill or piercing tool is required, (2) it can be installed as easily and simply as installing a conventional rivet, (3) it firmly grips both skins over considerable area thus increasing the resistance to being torn out of the honeycomb structure, (4) it distributes the load to both skins and is capable of full reverse loading, (5) it utilizes means which support the skins thus providing surfaces on which the outer flanges can grip, and (6) it can be utilized in any application where it is desirable to position a fastener through a structure made up of two sheets of material with a space between them. Thus, this invention provides a fastener that overcomes the problems of the prior art devices in a simple and effective manner.

Although particular embodiments of the invention have been illustrated and described, modifications thereof will be readily apparent to persons skilled in the art, and it is intended to cover in the appended claims all such modifications as come within the spirit and scope of the invention.

What I claim is:

1. A fastener adapted to extend through a structural material having spaced sheets comprising: an inner core means; an expandable spacer means; and an expander means; said inner core means and said expander means each being provided with a flange portion at one end thereof; said inner core means being additionally provided with a shoulder portion adjacent said flange portion thereof, said shoulder portion having substantially the same height as the thickness of associated structural material spaced sheets; said expandable spacer means being constructed of a rolled sheet of material and having a coil-like configuration with the ends thereof overlapping so as to define at least a substantially complete circle upon expanding and which is adapted to support spaced sheets of structural material when said fastener is operatively positioned therein, said expandable spacer means having a length substantially the same as the distance between spaced sheets of associated structural material when said fastener is operatively positioned therein, whereby movement of said expander means toward said inner core means causes said expandable spacer means to expand and readily move from abutment with said shoulder portion of said inner core means to abutment with an adjacent sheet of associated spaced sheet structural material and vice versa.

2. The fastener defined in claim 1, wherein each of said inner core means and said expander means includes a tapered surface.

3. The fastener defined in claim 1, wherein said inner core means additionally includes a tubular body having a tapering countersunk end opposite said flange portion.

4. The fastener defined in claim 3, wherein said tubular body is provided with threads extending at least partially along the length thereof.

5. The fastener defined in claim 3, wherein said tubular body is bottom tapped and threaded.

6. The fastener defined in claim 1, wherein said expander means additionally includes a tubular body having a tapering end opposite said flange portion.

7. The fastener defined in claim 6, wherein said flange portion is provided with a tapering countersink.

8. The fastener defined in claim 7, wherein said flange portion additionally includes a tapered surface.

(References on following page)

References Cited by the Examiner

UNITED STATES PATENTS

| | | | |
|---|---|---|---|
| 1,653,359 | 12/1927 | Goewey | 85—70 |
| 2,060,970 | 11/1936 | Belden | 52—617 |
| 2,266,611 | 12/1941 | Martin et al. | 285—222 |
| 2,290,619 | 7/1942 | Rieger | 285—222 |
| 2,700,172 | 1/1955 | Rohe | 85—39 |
| 2,868,056 | 1/1959 | La Torre | 85—73 |
| 2,967,593 | 1/1961 | Cushman | 151—41.7 |
| 3,008,552 | 11/1961 | Cushman et al. | 151—41.7 |
| 3,152,375 | 10/1964 | Blakeley | 85—64 |

FOREIGN PATENTS 640,865   5/1962   Canada.

CARL W. TOMLIN, *Primary Examiner.*

EDWARD C. ALLEN, *Examiner.*

M. PARSONS, JR., *Assistant Examiner.*